United States Patent
Li et al.

(10) Patent No.: US 10,208,437 B1
(45) Date of Patent: Feb. 19, 2019

(54) DAMPING BEARING IN CONVERTIBLE ANTISEISMIC MODE AND DAMPING BRIDGE APPARATUS

(71) Applicant: Sichuan University, Chengdu, Sichuan (CN)

(72) Inventors: Wenqiang Li, Sichuan (CN); Fei Li, Sichuan (CN); Yan Li, Sichuan (CN); Yudong Zhao, Sichuan (CN); Huaibang Han, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 15/984,357

(22) Filed: May 20, 2018

(30) Foreign Application Priority Data

Aug. 15, 2017 (CN) .......................... 2017 1 0705864

(51) Int. Cl.
*E01D 19/04* (2006.01)
*F16F 15/02* (2006.01)
*E04B 1/98* (2006.01)

(52) U.S. Cl.
CPC .......... *E01D 19/042* (2013.01); *F16F 15/022* (2013.01); *E04B 1/98* (2013.01)

(58) Field of Classification Search
CPC ......... E01D 19/042; E02D 31/08; E04B 1/98; E04B 1/985
USPC .......................................... 14/73.5; 52/167.4
See application file for complete search history.

(56) References Cited

U.S. PATENT DOCUMENTS

| 3,971,598 | A | * | 7/1976 | Rudge | E01D 19/046 384/36 |
| 4,320,549 | A | * | 3/1982 | Greb | E01D 19/046 14/73.5 |
| 5,597,239 | A | * | 1/1997 | Scaramuzza | E01D 19/046 384/36 |
| 6,021,992 | A | * | 2/2000 | Yen | E04H 9/021 248/560 |
| 6,126,136 | A | * | 10/2000 | Yen | E04H 9/021 248/560 |
| 8,006,339 | B1 | * | 8/2011 | Bennett | E01D 2/02 14/73.5 |

(Continued)

FOREIGN PATENT DOCUMENTS

| CN | 102392489 A | 3/2012 |
| CN | 202298452 U | 7/2012 |

(Continued)

*Primary Examiner* — Gary S Hartmann
(74) *Attorney, Agent, or Firm* — Wayne & Ken, LLC

(57) ABSTRACT

A damping bearing in convertible antiseismic mode and a damping bridge apparatus. The damping bearing includes a bearing body, a damping component, a hydraulic component, and a connecting piece. The bearing body includes a first bearing, a second bearing, and a third bearing. The damping component includes an arc damping member. The arc damping member is located between the first bearing and the second bearing. One end of the arc damping member is connected to the second bearing, the other end of the arc damping member is connected to the first bearing by using the connecting piece, and after the connecting piece is cut off, the arc damping member is capable of sliding relative to the first bearing. The hydraulic component is connected to the arc damping member and the second bearing respectively.

10 Claims, 7 Drawing Sheets

(56) References Cited

U.S. PATENT DOCUMENTS

| | | | | |
|---|---|---|---|---|
| 8,833,745 | B2 * | 9/2014 | Fujita | E04H 9/023 |
| | | | | 248/566 |
| 9,435,087 | B2 * | 9/2016 | Kim | F16C 13/04 |
| 2008/0098671 | A1 * | 5/2008 | Tsai | E04H 9/023 |
| | | | | 52/167.6 |
| 2009/0188179 | A1 * | 7/2009 | Huber | E04H 9/023 |
| | | | | 52/167.7 |
| 2010/0195942 | A1 * | 8/2010 | Tavecchio | E01D 19/04 |
| | | | | 384/36 |
| 2014/0026498 | A1 * | 1/2014 | Quaglini | E01D 19/046 |
| | | | | 52/167.4 |

FOREIGN PATENT DOCUMENTS

| | | | |
|---|---|---|---|
| CN | 104989436 | A | 10/2015 |
| CN | 205206077 | U | 5/2016 |
| CN | 205662834 | U | 10/2016 |
| CN | 207121816 | U | 3/2018 |
| TW | 200819596 | A | 5/2008 |

* cited by examiner

DAMPING BEARING IN CONVERTIBLE ANTISEISMIC MODE AND DAMPING BRIDGE APPARATUS

FIELD OF THE INVENTION

The present invention relates to the field of bridge antiseismic and bridge seismic mitigation and isolation technologies, and specifically, to a damping bearing in convertible antiseismic mode and a damping bridge apparatus.

BACKGROUND OF THE INVENTION

Earthquake is a phenomenon of propagation shaking caused by an interior violent motion of the earth. When a great earthquake breaks out, enormous seismic energy is released, causing massive damage to the earth surface and human engineering, and severely threatening the life and property safety of people. Damage caused by an earthquake to a bridge directly affects smoothness of a lifeline in an earthquake relief process. Therefore, how to enhance an antiseismic capability of a bridge and reduce damage of the bridge caused by an earthquake is a critical problem.

The nature and extent of damage caused to bridge structures vary depending on different structural forms and detail structures of bridges and earthquake motion characteristics on sites of the bridges. A bridge bearing is an important connecting structure between a superstructure and a substructure of a bridge, and its main function is to transfer load of the superstructure to a pier. Although a ratio of a cost of a bearing to a total cost of a bridge structure is very small, the bearing plays a significant role in the bridge structure. The bearing is a relatively weak link in the bridge structure. During an earthquake, if the bearing is damaged, other parts of the bridge are affected greatly, and consequently, earthquake damage becomes worse. Therefore, performance of the bearing decides overall performance of the bridge to some extent.

In a conventional bridge structure, an antiseismic bearing includes a lead rubber bearing, a high damping rubber bearing, an antiseismic pot bearing, a friction pendulum bearing, or the like. Under seismic load, these types of antiseismic bearings still have insufficient antiseismic capabilities, for example, a poor antitorque capability, an insufficient limiting capability, and a low impact resistance capability. In addition, to improve performance and reliability of seismic mitigation and isolation bearings, most bearings need to be used in cooperation with other damper structures. Therefore, a manufacturing process thereof is complex, high performance of materials is required, and a total system cost is greatly increased. From a perspective of environmental protection, pollution of the lead rubber bearing is severe.

SUMMARY OF THE INVENTION

An objective of the present invention is to provide a damping bearing in convertible antiseismic mode. The damping bearing has a simple structure, complete functions, stable performance, and a high antitorque capability under action of an earthquake. The damping bearing is capable of dissipating seismic energy in a plurality of manners and has high structural stability.

Another objective of the present invention is to provide a damping bridge apparatus. The damping bridge apparatus has a simple structure, complete functions, stable performance, and a high antitorque capability under action of an earthquake. The damping bridge apparatus is capable of dissipating seismic energy in a plurality of manners and has high structural stability.

A technical solution provided by the present invention is as follows:

A damping bearing in convertible antiseismic mode includes a bearing body, a damping component, a hydraulic component, and a connecting piece. The bearing body includes a first bearing, a second bearing, and a third bearing. The damping component includes an arc damping member. The arc damping member is located between the first bearing and the second bearing. One end of the arc damping member is connected to the second bearing, the other end of the arc damping member is connected to the first bearing by using the connecting piece, and the arc damping member is capable of sliding relative to the first bearing. One end of the hydraulic component is connected to one end of the arc damping member near to the connecting piece, and the other end of the hydraulic component is connected to the second bearing. A first connecting portion is disposed on one side of the second bearing near to the third bearing, and a second connecting portion in cooperation with the first connecting portion is disposed on one side of the third bearing near to the second bearing.

Further, the arc damping member includes an arc portion and connecting portions connected at two ends of the arc portion, the arc portion is connected to the second bearing, and the connecting portions are respectively connected to the first bearing and the hydraulic component.

Further, the damping component further includes an abutting component, and the abutting component abuts between the arc portion and the second bearing.

Further, the abutting component includes an abutting base and an abutting member, the abutting base is connected to one end of the second bearing near to the first bearing, and the abutting member abuts between the other end of the abutting base and the arc portion.

Further, the hydraulic component includes a piston rod, a piston cylinder, a damping hole, and an elastic part, the piston cylinder is connected to the second bearing, one end of the piston rod is accommodated in the piston cylinder and connected to the piston cylinder, the other end of the piston cylinder is connected to the arc damping member, and the elastic part abuts between one end of the piston rod far away from the piston cylinder and the piston cylinder.

Further, a limiting hole connected to the piston rod is provided in the arc damping member, and the limiting hole is capable of sliding along the piston rod.

Further, an accommodation space is provided at one end of the first bearing near to the connecting piece, a rubber gasket is disposed on a sidewall of the accommodation space, and the accommodation space may be used to accommodate an end portion of the arc damping member connected to the connecting piece.

Further, the first connecting portion includes a slot and a limiting groove, and the second connecting portion includes a protruding portion in cooperation with the slot and a limiting protrusion in cooperation with the limiting groove.

Further, a cushion rubber abuts between the protruding portion and a sidewall of the slot, and a damping rubber abuts between the protruding portion and a bottom wall of the slot.

A damping bridge apparatus includes a bridge body, a pier, and a damping bearing in convertible antiseismic mode. The damping bearing in convertible antiseismic mode includes a bearing body, a damping component, a hydraulic component, and a connecting piece. The bearing body includes a first bearing, a second bearing, and a third bearing. The damping component includes an arc damping member. The arc damping member is located between the first bearing and the second bearing. One end of the arc damping member is connected to the second bearing, the other end of the arc damping member is connected to the first bearing by using the connecting piece, and the arc damping member is capable of sliding relative to the first bearing. One end of the hydraulic component is connected to one end of the arc damping member near to the connecting piece, and the other end of the hydraulic component is connected to the second bearing. A first connecting portion is disposed on one side of the second bearing near to the third bearing, and a second connecting portion in cooperation with the first connecting portion is disposed on one side of the third bearing near to the second bearing. The damping bearing in convertible antiseismic mode is located between the bridge body and the pier, the first bearing is connected to the bridge body, and the third bearing is connected to the pier.

Compared with the prior art, the damping bearing in convertible antiseismic mode and the damping bridge apparatus provided by the present invention have the following beneficial effects:

Normally, the damping bearing in convertible antiseismic mode is a restraint system. In this case, the arc damping member is fixedly connected to the first bearing by using the connecting piece. One end of the arc damping member is connected to the first bearing by using the connecting piece, and the other end of the arc damping member is connected to the second bearing. Two ends of the hydraulic component are respectively connected to the arc damping member and the second bearing, and a portion of the hydraulic component connected to the arc damping member can further play a role of bearing the arc damping member. In this case, the connecting piece is used to bear horizontal shearing force. A designed bearing capacity of the connecting piece can ensure that, under normal circumstances, the connecting piece is not cut off by wind vibration or small- or medium-magnitude earthquake, but is cut off under action of a great earthquake. Therefore, under normal working conditions, the arc damping member maintains its structural stability under joint action of the connecting piece and the hydraulic component. The first connecting portion and the second connecting portion are interconnected to ensure that the second bearing and the third bearing are not horizontally displaced. In addition, the damping bearing can maintain structural stability in a strong wind and absorb energy generated by wind vibration. In a great earthquake, because the arc damping member receives a tremendous instantaneous impact, a portion of the arc damping member connected to the first bearing is displaced, the connecting piece is cut off, and the damping bearing in convertible antiseismic mode is converted into a damping system. In this case, the connecting piece is cut off, and the first bearing and the arc damping member are capable of sliding relative to each other. The hydraulic component can absorb instantaneous impact energy generated during breaking of the connecting piece and energy transferred to the bearing during the earthquake. After one end of the hydraulic component connected to the arc damping member is pressed, a viscous damping medium in the hydraulic component is caused to flow and absorb some load. Because the viscous damping medium cannot flow massively within a short time, the hydraulic component cannot move within a short time, and further, the whole structure is locked in a rigid state, and system strength is enhanced. Because great torque is generated during the earthquake, the second bearing and the third bearing rotate relative to each other. The second connecting portion on the third bearing and the first connecting portion on the second bearing can limit rotation angles of the second bearing and the third bearing in a horizontal direction. After the earthquake disappears, pressure received by one end of the hydraulic component near to the first bearing is reduced, and the hydraulic component is gradually reset. Therefore, the arc damping member is restored to a stable position to some extent to maintain basic functions of the bearing. Because the third bearing is slightly displaced under action of the first connecting portion and the second connecting portion, the third bearing gradually moves to its initial position under action of opposite force. Therefore, after the earthquake disappears, the damping bearing in convertible antiseismic mode can maintain its function of bearing the superstructure to some extent, and maintain a smooth lifeline for earthquake relief. Featuring a simple structure, complete functions, stable performance, and a high antitorque capability under action of an earthquake, the damping bearing in convertible antiseismic mode and the damping bridge apparatus provided by the present invention are capable of dissipating seismic energy in a plurality of manners and have high structural stability.

BRIEF DESCRIPTION OF THE DRAWINGS

To describe the technical solutions in the embodiments of the present invention more clearly, the following briefly describes the accompanying drawings required for the embodiments. It should be understood that, the following drawings merely show some embodiments of the present invention, and therefore should not be construed as limitations to the scope. A person of ordinary skill in the art may still derive other drawings from these drawings without creative efforts.

Figure 1:
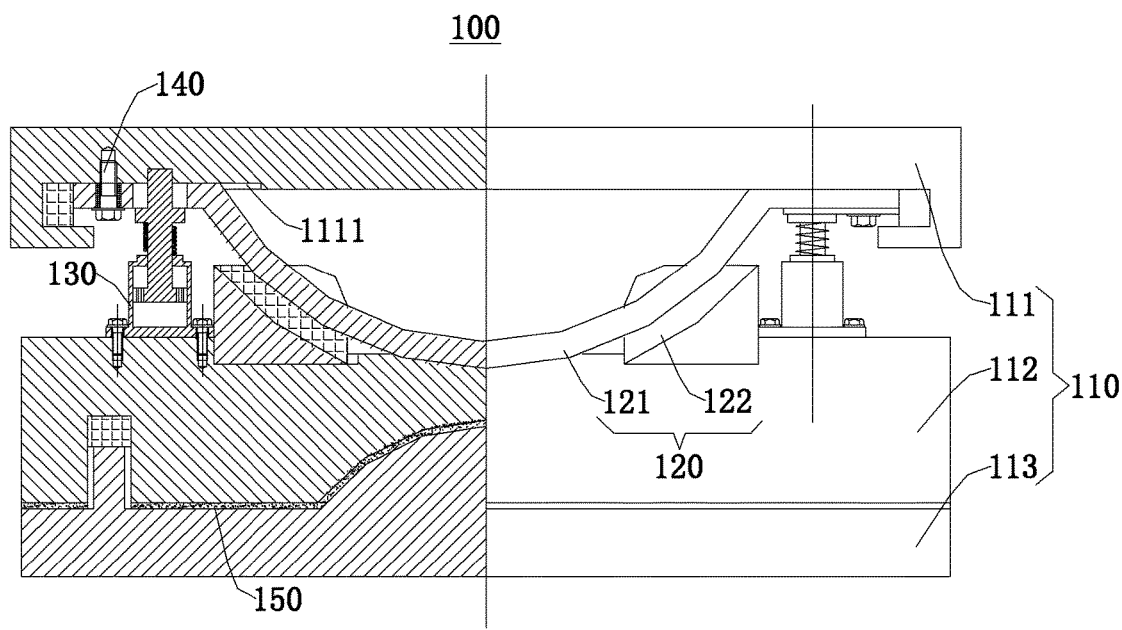
FIG. 1 is a schematic structural diagram of a damping bearing in convertible antiseismic mode according to a first embodiment of the present invention.

Legend: 100—damping bearing in convertible antiseismic mode; 110—bearing body; 111—first bearing; 1111—mounting groove; 112—second bearing; 1121—first connecting portion; 11211—slot; 11212—limiting groove; 1122—mounting slot; 113—third bearing; 1131—second connecting portion; 11311—protruding portion; 11312—limiting protrusion; 114—accommodation space; 115—rubber gasket; 116—damping rubber; 117—cushion rubber; 120—damping component; 121—arc damping member; 1211—arc portion; 12111—second connecting hole; 1212—connecting portion; 12121—first connecting hole; 12122— limiting hole; 122—abutting component; 1221—abutting base; 12211—first connecting base; 12212—second connecting base; 1222—abutting member; 123—third connecting hole; 130—hydraulic component; 131—piston rod; 132—piston cylinder; 133—elastic part; 140—connecting piece; 141—rubber bushing; 150—friction cushion.

DETAILED DESCRIPTION OF THE INVENTION

To make the objectives, technical solutions, and advantages of the embodiments of the present invention clearer, the following describes the technical solutions of the embodiments of the present invention clearly and completely with reference to the accompanying drawings in the embodiments of the present invention. Apparently, the described embodiments are a part rather than all of the embodiments. Generally, components in the embodiments of the present invention described and shown in the drawings herein may be disposed and designed according to different configurations.

Therefore, the following detailed description of the embodiments of the present invention provided in the drawings is not intended to limit the protection scope of the present invention, but merely to represent selected embodiments of the present invention. All other embodiments obtained by a person of ordinary skill in the art without creative efforts based on the embodiments of the present invention also fall within the protection scope of the present invention.

It should be noted that, similar reference numbers and letters in the following drawings represent similar items. Therefore, once an item is defined in a drawing, the item does not need to be further defined and explained in subsequent drawings.

It should be understood that, in the description of the present invention, an orientation or a position relationship indicated by a term "upper", "lower", "inside", "outside", "left", "right", or the like is an orientation or a position relationship based on the drawings, or is a usual orientation or position relationship of the product of the present invention in use, or is an orientation or a position relationship usually understood by a person skilled in the art, and is used merely for describing the present invention and simplifying the description. The term does not indicate or imply that a device or an component in question must have a specific orientation and must be constructed and operated in a specific orientation, and therefore should not be understood as a limitation to the present invention.

In addition, terms such as "first" and "second" are used merely for differential description purposes and cannot be understood as indications or implications of relative importance.

It should also be noted that, in the description of the present invention, unless otherwise specified and defined, terms "disposition" and "connection" should be understood in a broad sense. For example, the "connection" may be a fixed connection, a detachable connection, or an integrated connection, may be a mechanical connection or an electrical connection, may be a direct connection or an indirect connection through an intermediate medium, or may be an internal connection between two components. A person of ordinary skill in the art may understand specific meanings of the foregoing terms in the present invention according to actual situations.

The following describes in detail the embodiments of the present invention with reference to the accompanying drawings.

First Embodiment

Referring to FIG. 1, this embodiment provides a damping bearing 100 in convertible antiseismic mode. The damping bearing has a simple structure, complete functions, stable performance, and a high antitorque capability under action of an earthquake. The damping bearing is capable of dissipating seismic energy in a plurality of manners and has high structural stability.

The damping bearing 100 in convertible antiseismic mode according to this embodiment includes a bearing body 110, a damping component 120, a hydraulic component 130, and a connecting piece 140. The bearing body 110 includes a first bearing 111, a second bearing 112, and a third bearing 113. The damping component 120 includes an arc damping member 121. The arc damping member 121 is located between the first bearing 111 and the second bearing 112. One end of the arc damping member 121 is connected to the second bearing 112, the other end of the arc damping member 121 is connected to the first bearing 111 by using the connecting piece 140, and the arc damping member 121 is capable of sliding relative to the first bearing 111. One end of the hydraulic component 130 is connected to one end of the arc damping member 121 near to the connecting piece 140, and the other end of the hydraulic component 130 is connected to the second bearing 112. A first connecting portion 1121 is disposed on one side of the second bearing 112 near to the third bearing 113, and a second connecting portion 1131 in cooperation with the first connecting portion 1121 is disposed on one side of the third bearing 113 near to the second bearing 112.

It should be noted that, normally, the arc damping member 121 is fixedly connected to the first bearing 111 by using the connecting piece 140. When the connecting piece 140 bears excessive shearing stress, the connecting piece 140 is cut off, and in this case, the arc damping member 121 is capable of sliding relative to the first bearing 111.

Figure 2:
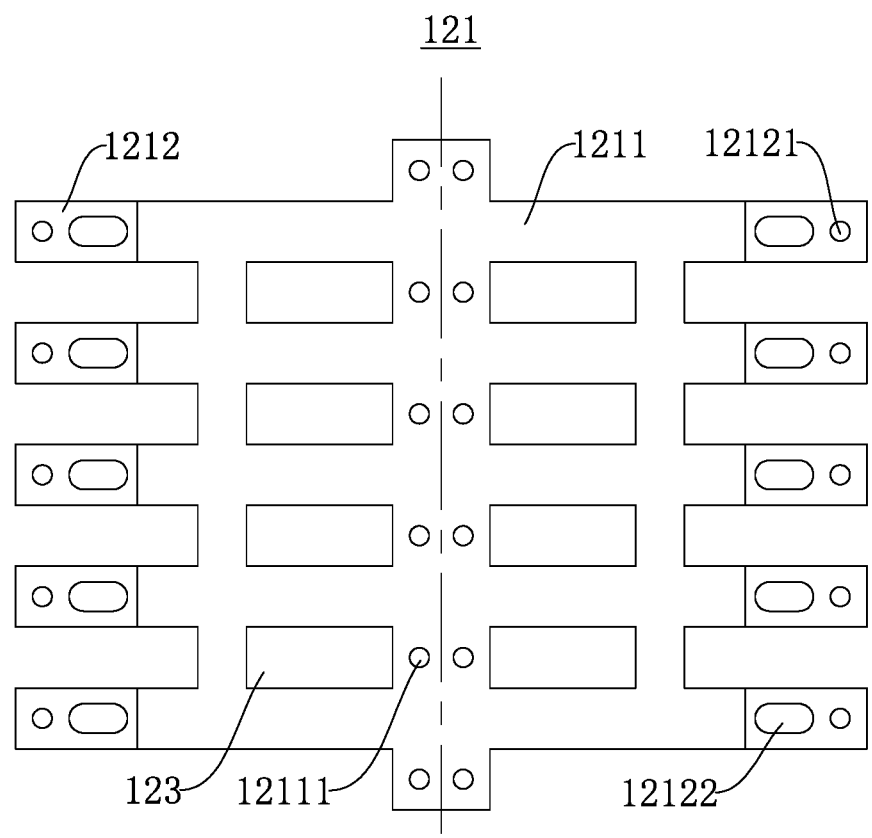
FIG. 2 is a schematic structural diagram an arc damping member according to the first embodiment of the present invention.

Referring to FIG. 1 and FIG. 2, in this embodiment, the arc damping member 121 includes an arc portion 1211 and connecting portions 1212 connected at two ends of the arc portion 1211, the arc portion 1211 is connected to the second bearing 112, and the connecting portions 1212 are respectively connected to the first bearing 111 and the hydraulic component 130.

In this embodiment, the damping component 120 further includes an abutting component 122 that abuts between the arc portion 1211 and the second bearing 112.

In this embodiment, the arc damping member 121 is made of a whole steel sheet. Certainly, this is not limited. In other embodiments of the present invention, the arc damping member 121 may also be made in other manners, for example, formed by bending a plurality of steel blocks.

It may be understood that, there may be one or more arc damping members 121. A quantity of arc damping members 121 is not specifically limited in this embodiment. In addition, a plurality of arc damping members 121 may be independent of each other, or may be interconnected in sequence.

In this embodiment, a first connecting hole 12121 connected to the first bearing 111 and a limiting hole 12122 that may be connected in a sliding manner to the hydraulic component 130 are provided in the connecting portion 1212. A second connecting hole 12111 connected to the second bearing 112 is provided in the arc portion 1211. In addition, in this embodiment, the plurality of arc damping members 121 are interconnected in sequence, and a third connecting hole 123 that may be connected to the abutting component 122 is provided between two adjacent arc damping members 121.

It should be noted that, in this embodiment, in order that the connecting portion 1212 is connected to the first bearing 111 more firmly, a mounting groove 1111 in cooperation with the connecting portion 1212 is further provided in the first bearing 111. The connecting portion 1212 may be partly accommodated in the mounting groove 1111. The connecting portion 1212 may be limited by a sidewall of the mounting groove 1111.

Figure 3:
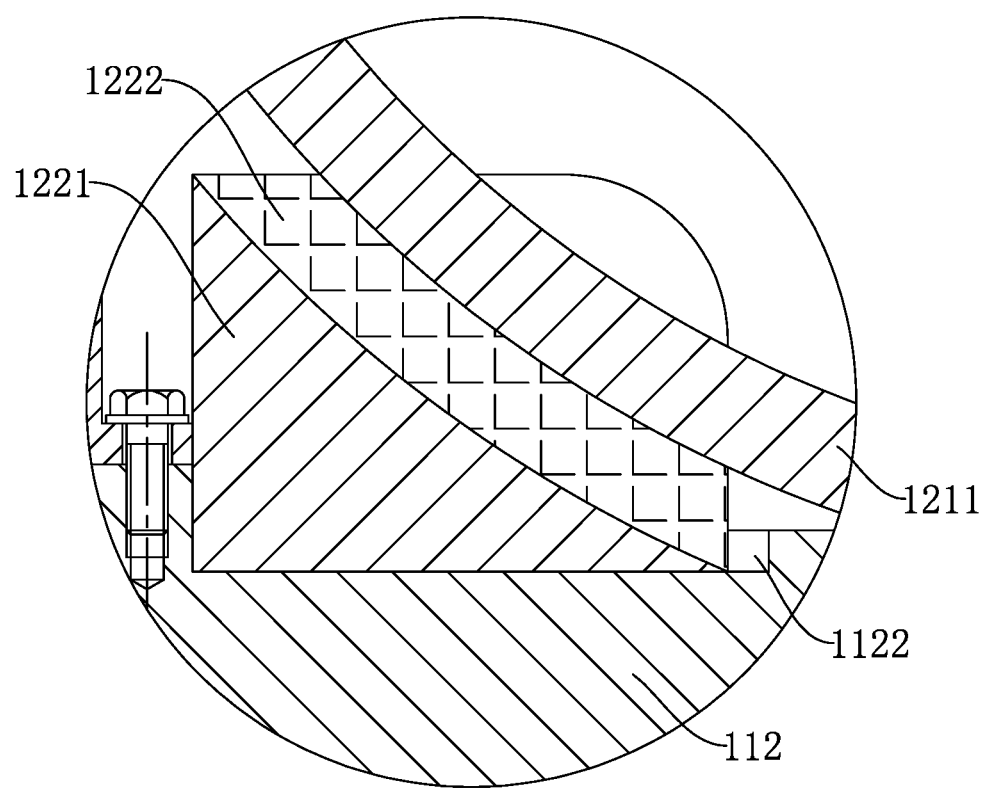
FIG. 3 is a schematic structural diagram an abutting component according to the first embodiment of the present invention.

Referring to FIG. 3, the abutting component 122 includes an abutting base 1221 and an abutting member 1222, the abutting base 1221 is connected to one end of the second bearing 112 near to the first bearing 111, and the abutting member 1222 abuts between the other end of the abutting base 1221 and the arc portion 1211.

Figure 4:
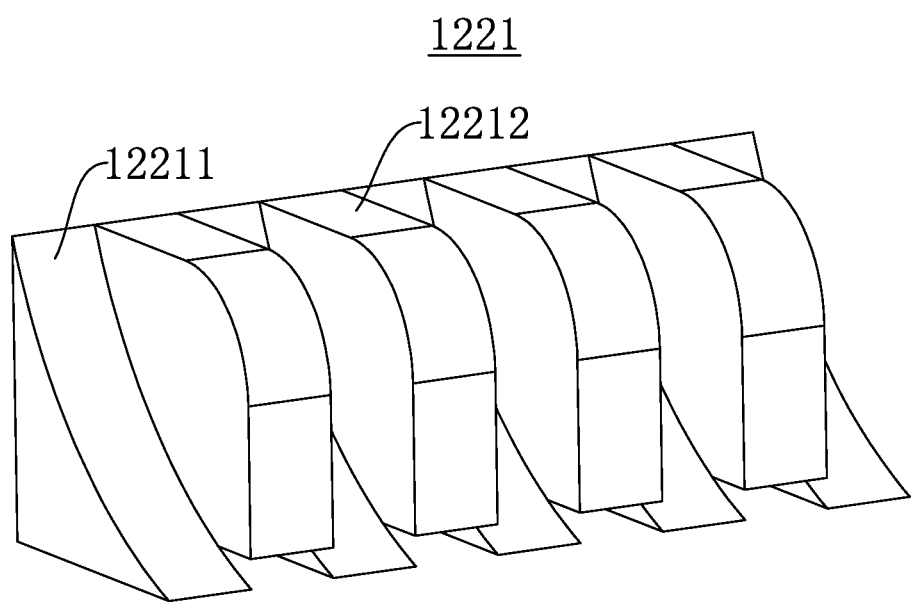
FIG. 4 is a schematic structural diagram an abutting base according to the first embodiment of the present invention.

Referring to FIG. 4, the abutting base 1221 includes a plurality of first connecting bases 12211 and a plurality of second connecting bases 12212 that are interconnected in sequence. The first connecting base 12211 is connected to the second bearing 112, and the second connecting base 12212 is connected to the arc damping member 121. The abutting member 1222 abuts between one end of the first connecting base 12211 far away from the second bearing 112 and the arc damping member 121, and plays a role of buffering when the arc damping member 121 receives pressure. Preferably, the abutting member 1222 is made of an elastic material, for example, a rubber.

In this embodiment, a mounting slot 1122 connected to the first connecting base 12211 is provided in the second bearing 112. A shape and a structure of the mounting slot 1122 match those of the first connecting base 12211, so that the first connecting base 12211 is more firmly mounted on the second bearing 112. In addition, in this embodiment, the second connecting base 12212 is clamped with the third connecting hole 123.

Figure 5:
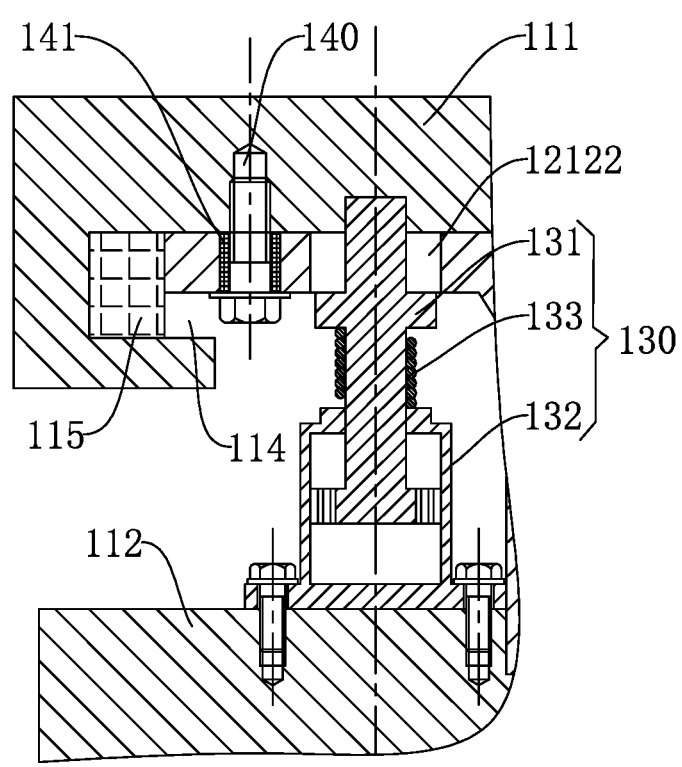
FIG. 5 is a schematic structural diagram a hydraulic component according to the first embodiment of the present invention.

Referring to FIG. 5, the hydraulic component 130 includes a piston rod 131, a piston cylinder 132, and an elastic part 133, the piston cylinder 132 is connected to the second bearing 112, one end of the piston rod 131 is accommodated in the piston cylinder 132 and connected to the piston cylinder 132, the other end of the piston cylinder 132 is connected to the arc damping member 121, and the elastic part 133 abuts between one end of the piston rod 131 far away from the piston cylinder 132 and the piston cylinder 132.

In this embodiment, the piston rod 131 is connected to the limiting hole 12122 provided in the arc damping member 121. When the connecting piece 140 is cut off, the connecting portion 1212 may drive the limiting hole 12122 to slide along the piston rod 131.

It may be understood that, after one end of the piston rod 131 near to the first bearing 111 is pressed, the piston rod 131 is displaced relative to the piston cylinder 132, and a viscous damping medium in the piston cylinder 132 moves in upper and lower chambers and absorbs load transferred by the piston rod 131. The elastic part 133 located between the piston rod 131 and the piston cylinder 132 can absorb a part of energy. This can avoid a malfunction after the hydraulic component 130 receives an instantaneous impact. Because the viscous damping medium cannot flow massively in the upper and lower chambers within a short time, the piston rod 131 cannot move within a short time. Therefore, the whole structure is locked in a rigid state, and system strength is further enhanced.

In this embodiment, one end of the piston rod 131 near to the first bearing 111 is partly embedded in the first bearing 111 to ensure that the piston rod 131 does not fall off from the first bearing 111 during an earthquake.

In this embodiment, the connecting piece 140 is a shearing bolt, and the shearing bolt is sleeved with a rubber bushing 141 to adapt to displacement of two ends of the arc damping member 121 caused by thermal deformation under normal working conditions.

In this embodiment, an accommodation space 114 is provided at one end of the first bearing 111 near to the connecting piece 140, a rubber gasket 115 is provided on a sidewall of the accommodation space 114, and the accommodation space 114 may be used to accommodate an end portion of the arc damping member 121 connected to the connecting piece 140.

It may be understood that, when the connecting piece 140 is broken, the arc damping member 121 moves to the two ends, and the end portion of the arc damping member 121 moves toward the accommodation space 114. A purpose of the accommodation space 114 is to accommodate the end portion of the arc damping member 121 connected to the connecting piece 140, to prevent the end portion from falling off. The rubber gasket 115 disposed in the accommodation space 114 can reduce the impact when the arc damping member 121 moves toward the accommodation space 114, and facilitate resetting of the arc damping member 121 after the earthquake.

Figure 6:
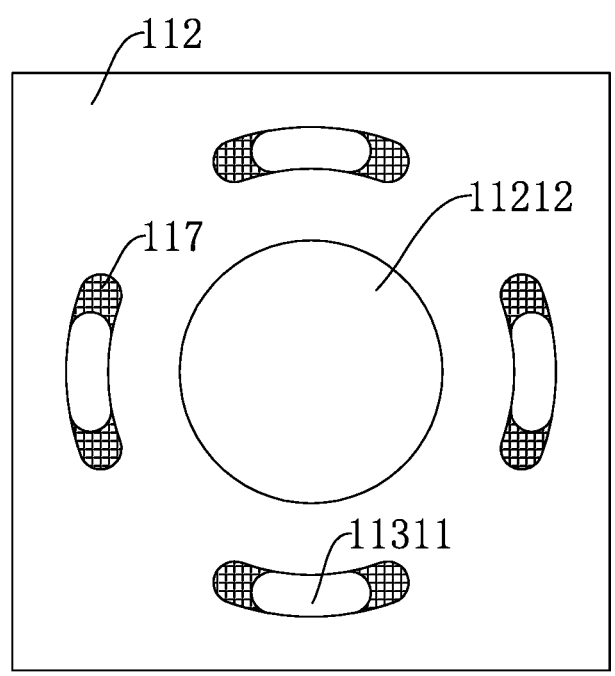
FIG. 6 is a schematic structural diagram a cushion rubber according to the first embodiment of the present invention.
Figure 7:
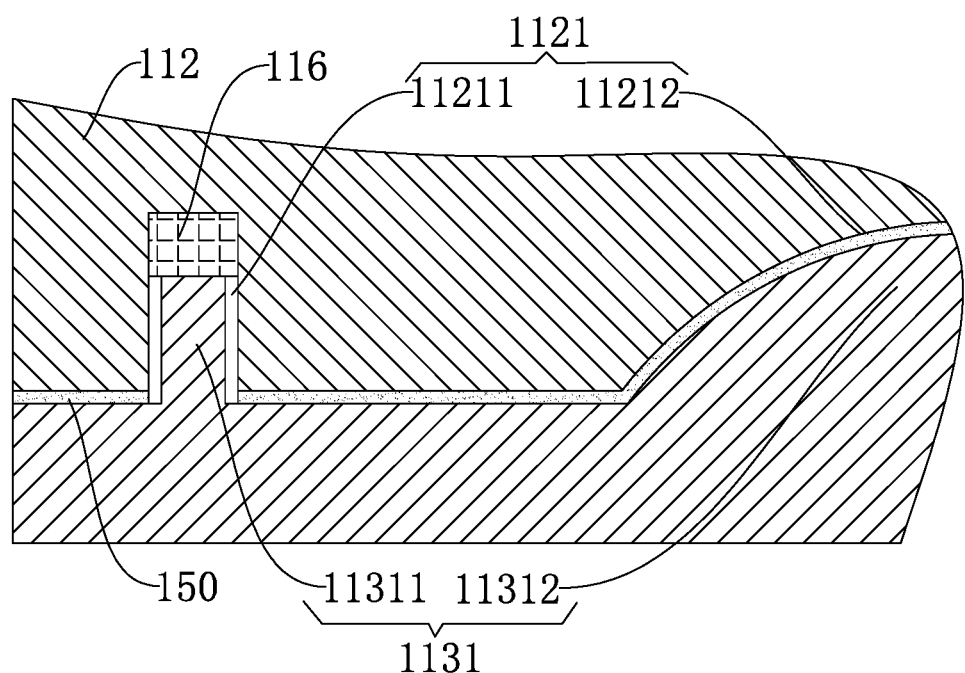
FIG. 7 is a schematic structural diagram of a first connecting portion and a second connecting portion according to the first embodiment of the present invention.

Referring to FIG. 1, FIG. 6, and FIG. 7, in this embodiment, the first connecting portion 1121 cooperates with the second connecting portion 1131 to avoid moving of the second bearing 112 and the third bearing 113 relative to each other in a horizontal direction.

In this embodiment, the first connecting portion 1121 includes a slot 11211 and a limiting groove 11212, and the second connecting portion 1131 includes a protruding portion 11311 in cooperation with the slot 11211 and a limiting protrusion 11312 in cooperation with the limiting groove 11212.

It should be noted that, a height of the slot 11211 is greater than a height of the protruding portion 11311, that is, there is a certain space between the protruding portion 11311 and the slot 11211. The space can partly absorb displacement of the second bearing 112 or the third bearing 113 in a vertical direction, and further avoid damage of the slot 11211 and the protruding portion 11311 and prolong their service life. Preferably, a damping rubber 116 abuts between the protruding portion 11311 and a bottom wall of the slot 11211.

It should be noted that, a width of the slot 11211 is also greater than a width of the protruding portion 11311, and a cushion rubber 117 abuts between the protruding portion 11311 and a sidewall of the slot 11211. Under normal working conditions, the cushion rubber 117 can limit displacement to ensure structural stability. Under action of an earthquake, the cushion rubber 117 can avoid excessive rotational displacement of the structure, and play a role of buffering. After the earthquake disappears, because the rubber is previously pressed, opposite force is generated, and in this case, the opposite force pushes the structure to be reset gradually.

In this embodiment, a damping groove is further provided at one end of the second bearing 112 near to the third bearing 113, and a damping protrusion in cooperation with the damping groove is provided at one end of the third bearing 113 near to the second bearing 112.

It may be understood that, because a joint between the protruding portion 11311 and the third bearing 113 is vertical to a horizontal plane, the protruding portion 11311 is less capable of bearing horizontal shearing force, and may be easily cut off when the horizontal shearing force is too great. The cooperation between the limiting protrusion 11312 and the limiting groove 11212 can limit horizontal displacement. In other words, the protruding portion 11311 and the slot 11211 are mainly used to limit rotation angles of the second bearing 112 and the third bearing 113; the limiting protrusion 11312 and the limiting groove 11212 limit horizontal displacement of the second bearing 112 and the third displacement 113; and energy may be consumed through friction between contact surfaces of the limiting protrusion 11312 and the limiting groove 11212 when the second bearing 112 and the third bearing rotate relative to each other.

In this embodiment, the limiting protrusion 11312 is a convex spheroid, and the limiting groove 11212 is a concave spheroid in cooperation with the convex spheroid. In other words, a joint face between the limiting protrusion 11312 and the limiting groove 11212 is a sphere. A contact area of the sphere is large, and this can enhance a capability of consuming energy through friction between the limiting protrusion 11312 and the limiting groove 11212 when the second bearing 112 and the third bearing 113 rotate relative to each other.

In addition, in this embodiment, a friction cushion is further disposed between the second bearing 112 and the third bearing 113 to increase a coefficient of friction between the second bearing 112 and the third bearing 113 and avoid abrasion caused by mutual sliding of the second bearing 112 and the third bearing 113.

An operating principle and beneficial effects of the damping bearing 100 in convertible antiseismic mode according to this embodiment are as follows: Normally, the damping bearing 100 in convertible antiseismic mode is a restraint system. One end of the arc damping member 121 is connected to the first bearing 111 by using the connecting piece 140, and the other end of the arc damping member 121 is connected to the second bearing 112. Two ends of the hydraulic component 130 are respectively connected to the arc damping member 121 and the second bearing 112, and a portion of the hydraulic component 130 connected to the arc damping member 121 can further play a role of bearing the arc damping member 121. In this case, the connecting piece 140 is used to bear horizontal shearing force. A designed bearing capacity of the connecting piece 140 can ensure that, under normal circumstances, the connecting piece 140 is not cut off by wind vibration or small- or medium-magnitude earthquake, but is cut off under action of a great earthquake. Therefore, under normal working conditions, the arc damping member 121 maintains its structural stability under joint action of the connecting piece 140 and the hydraulic component 130. The first connecting portion 1121 and the second connecting portion 1131 cooperate to ensure that the second bearing 112 and the third bearing 113 are not horizontally displaced. In addition, the damping bearing can maintain structural stability in a strong wind and absorb energy generated by wind vibration.

In a great earthquake, because the arc damping member 121 receives a tremendous instantaneous impact, a portion of the arc damping member 121 connected to the first bearing 111 is displaced, the connecting piece 140 is cut off, and the damping bearing 100 in convertible antiseismic mode is converted into a damping system. The hydraulic component 130 can absorb instantaneous impact energy generated during breaking of the connecting piece 140 and energy transferred to the bearing during the earthquake. After one end of the hydraulic component 130 connected to the arc damping member 121 is pressed, the viscous damping medium in the hydraulic component 130 is caused to flow and absorb some load. Because the viscous damping medium cannot flow massively within a short time, the hydraulic component 130 cannot move within a short time, and further, the whole structure is locked in a rigid state, and system strength is enhanced.

Because great torque is generated during the earthquake, the second bearing 112 and the third bearing 113 rotate relative to each other. The second connecting portion 1131 on the third bearing 113 and the first connecting portion 1121 on the second bearing 112 can limit rotation angles of the second bearing 112 and the third bearing 113 in the horizontal direction. After the earthquake disappears, pressure received by one end of the hydraulic component 130 near to the first bearing 111 is reduced, and the hydraulic component is gradually reset. Therefore, the arc damping member 121 is restored to a stable position to some extent to maintain basic functions of the bearing. Because the third bearing 113 is slightly displaced under action of the first connecting portion 1121 and the second connecting portion 1131, the third bearing 113 gradually moves to its initial position under action of opposite force. Therefore, after the earthquake disappears, the damping bearing 100 in convertible antiseismic mode can maintain its function of bearing the superstructure to some extent, and maintain a smooth lifeline for earthquake relief.

Featuring a simple structure, complete functions, stable performance, and a high antitorque capability under action of an earthquake, the damping bearing 100 in convertible antiseismic mode according to this embodiment is capable of dissipating seismic energy in a plurality of manners and has high structural stability.

Second Embodiment

This embodiment provides a damping bridge apparatus (not shown in the figures), including a bridge body (not shown in the figures), a pier (not shown in the figures), and a damping bearing 100 in convertible antiseismic mode. The damping bearing 100 in convertible antiseismic mode includes a first bearing 111, a second bearing 112, a third bearing 113, a damping component 120, a hydraulic component 130, and a connecting piece 140. The damping component 120 includes an arc damping member 121. The arc damping member 121 is located between the first bearing 111 and the second bearing 112. One end of the arc damping member 121 is connected to the second bearing 112, the other end of the arc damping member 121 is connected to the first bearing 111 by using the connecting piece 140, and when the connecting piece 140 falls off, the arc damping member 121 is capable of sliding relative to the first bearing 111. One end of the hydraulic component 130 is connected to one end of the arc damping member 121 near to the connecting piece 140, and the other end of the hydraulic component 130 is connected to the second bearing 112. A first connecting portion 1121 is disposed on one side of the second bearing 112 near to the third bearing 113, and a second connecting portion 1131 clamped with the first connecting portion 1121 is disposed on one side of the third bearing 113 near to the second bearing 112. The damping bearing 100 in convertible antiseismic mode is located between the bridge body and the pier, the first bearing 111 is connected to the bridge body, and the third bearing 113 is connected to the pier.

Featuring a simple structure, complete functions, stable performance, and a high antitorque capability under action of an earthquake, the damping bridge apparatus provided by this embodiment is capable of dissipating seismic energy in a plurality of manners and has high structural stability.

The foregoing descriptions are merely preferred embodiments of the invention, and are not intended to limit the present invention. A person skilled in the art may make various modifications or variations to the present invention. Any modification, equivalent replacement, improvement, or the like made without departing from the spirit and principle of the present invention shall fall within the protection scope of the present invention.

What is claimed is:

1. A damping bearing in convertible antiseismic mode, comprising a bearing body, a damping component, a hydraulic component, and a connecting piece;

wherein the bearing body comprises a first bearing, a second bearing, and a third bearing;

the damping component comprises an arc damping member, the arc damping member is located between the first bearing and the second bearing; a first end of the arc damping member is connected to the second bearing and a second end of the arc damping member is connected to the first bearing through the connecting piece, and the arc damping member is capable of sliding relative to the first bearing;

a first end of the hydraulic component is connected to a first end of the arc damping member adjacent to the connecting piece, and a second end of the hydraulic component is connected to the second bearing;

a first connecting portion is disposed on one side of the second adjacent to the third bearing; and a second connecting portion in cooperation with the first connecting portion is disposed on one side of the third bearing adjacent to the second bearing.

2. The damping bearing in convertible antiseismic mode according to claim 1, wherein the arc damping member comprises an arc portion and connecting portions connected at two ends of the arc portion; the arc portion is connected to the second bearing; and the connecting portions are respectively connected to the first bearing and the hydraulic component.

3. The damping bearing in convertible antiseismic mode according to claim 2, wherein the damping component further comprises an abutting component; and the abutting component abuts between the arc portion and the second bearing.

4. The damping bearing in convertible antiseismic mode according to claim 3, wherein the abutting component comprises an abutting base and an abutting member; the abutting base is connected to a first end of the second bearing adjacent to the first bearing; and the abutting member abuts between a second end of the abutting base and the arc portion.

5. The damping bearing in convertible antiseismic mode according to claim 1, wherein the hydraulic component comprises a piston rod, a piston cylinder, a damping hole, and an elastic part; the piston cylinder is connected to the second bearing; a first end of the piston rod is accommodated in the piston cylinder and connected to the piston cylinder and a second end of the piston cylinder is connected to the arc damping member; and the elastic part abuts between the second end of the piston rod and the piston cylinder.

6. The damping bearing in convertible antiseismic mode according to claim 5, wherein a limiting hole connected to the piston rod is provided in the arc damping member; and the limiting hole is capable of sliding along the piston rod.

7. The damping bearing in convertible antiseismic mode according to claim 1, wherein an accommodation space is provided at a first end of the first bearing adjacent to the connecting piece; a rubber gasket is disposed on a sidewall of the accommodation space; and the accommodation space is used to accommodate an end portion of the arc damping member connected to the connecting piece.

8. The damping bearing in convertible antiseismic mode according to claim 1, wherein the first connecting portion comprises a slot and a limiting groove; and the second connecting portion comprises a protruding portion in cooperation with the slot and a limiting protrusion in cooperation with the limiting groove.

9. The damping bearing in convertible antiseismic mode according to claim 8, wherein a cushion rubber abuts between the protruding portion and a sidewall of the slot; and a damping rubber abuts between the protruding portion and a bottom wall of the slot.

10. A damping bridge apparatus, comprising a bridge body, a pier, and the damping bearing in convertible antiseismic mode of claim 1; wherein the damping bearing in convertible antiseismic mode is located between a bridge body and a pier; the first bearing is connected to the bridge body and the third bearing is connected to the pier.

* * * * *